(12) United States Patent
Kanzaki

(10) Patent No.: US 7,802,369 B2
(45) Date of Patent: Sep. 28, 2010

(54) METHOD FOR DESIGNING STRUCTURE BY DRAWING CURVE APPROXIMATELY WITH CIRCULAR SEGMENT, AND STRUCTURE THEREBY

(76) Inventor: Takahiro Kanzaki, 8-10 Honamanuma, 3-chome, Suginami-ku, Tokyo, 167-0031 (JP)

( * ) Notice: Subject to any disclaimer, the term of this patent is extended or adjusted under 35 U.S.C. 154(b) by 125 days.

(21) Appl. No.: 12/184,558

(22) Filed: Aug. 1, 2008

(65) Prior Publication Data

US 2009/0049701 A1   Feb. 26, 2009

(30) Foreign Application Priority Data

Aug. 20, 2007   (JP)   ............................. 2007-240154

(51) Int. Cl.
*B43L 9/00* (2006.01)
*G06G 1/16* (2006.01)

(52) U.S. Cl. ........................ 33/27.01; 33/1 G; 434/214; 52/236.2

(58) Field of Classification Search ................. 33/1 G, 33/27.01, 27.02, 27.03, 30.1–30.7, 518, 561.1–561.3; 52/236.2, 245; 434/211, 213, 214
See application file for complete search history.

(56) References Cited

U.S. PATENT DOCUMENTS

| | | | |
|---|---|---|---|
| 520,003 A | 5/1894 | Lehner |
| 773,035 A | 10/1904 | Smith |
| 2,677,890 A | 5/1954 | Friedman |
| 2,692,432 A | 10/1954 | Stanley |
| 2,827,633 A | 3/1958 | Himes |
| 2,924,021 A | 2/1960 | Proett et al. |
| 2,970,312 A | 1/1961 | Smith |
| 3,007,247 A | 11/1961 | Boehm |

(Continued)

FOREIGN PATENT DOCUMENTS

DE    10057636    6/2002

(Continued)

OTHER PUBLICATIONS

J.B. Calvert, "Ellipse", Created May 6, 2002, http://du.edu/~jcalvert/math/ellipse.htm, pp. 1-7.

(Continued)

*Primary Examiner*—G. Bradley Bennett
(74) *Attorney, Agent, or Firm*—Stites & Harbison PLLC; Douglas E. Jackson

(57) ABSTRACT

A method for designing a structure or the like is provided in which an arbitrary curve is approximately drawn using a circular segment. This method includes the steps of: setting a straight line which connects one end of a desired curve and the other end thereof; setting an intersection point of the curve and a perpendicular to the straight line at a middle point thereof; obtaining a distance between the intersection point and the middle point, and a length of a straight-line segment from each of the one end and the other end of the curve up to the middle point; setting a curvature radius of a circular segment which approximates the desired curve in association with these distance and length, and acquiring a radius center point of the circular segment; and setting a circular segment from the one end up to the other end of the curve by using this center point as the center thereof.

3 Claims, 6 Drawing Sheets

U.S. PATENT DOCUMENTS

| | | |
|---|---|---|
| 3,046,660 A | 7/1962 | Fuess |
| 3,186,268 A | 6/1965 | Hoglund |
| 3,438,532 A | 4/1969 | Chibaeff |
| 3,472,033 A | 10/1969 | Brown |
| 3,524,257 A | 8/1970 | Jakubowski |
| 3,927,477 A | 12/1975 | Harris |
| 3,994,108 A | 11/1976 | Johnson |
| 4,532,714 A | 8/1985 | Spinning |
| 4,665,664 A | 5/1987 | Knight |
| 5,870,106 A | 2/1999 | Langelaan |
| 6,192,634 B1 | 2/2001 | Lopez |
| 6,405,444 B1 | 6/2002 | Osborne |
| 6,415,518 B1 | 7/2002 | Sims |
| 6,441,822 B1 * | 8/2002 | Johnson ............... 345/442 |
| 6,904,697 B2 | 6/2005 | Zars |
| 7,174,645 B2 * | 2/2007 | Kanzaki ............... 33/30.1 |
| 2004/0139663 A1 * | 7/2004 | Kanzaki ............... 52/80.1 |

FOREIGN PATENT DOCUMENTS

| | | |
|---|---|---|
| GB | 2155969 | 10/1985 |

OTHER PUBLICATIONS

Paul L. Rosin et al., "The Ellipse and the Five-centered Arch", last modified Jun. 22, 2004, http://users.cs.cf.ac.uk/Paul.Rosin/resources/papers, pp. 1-10.

Paul L. Rosin, "On the Construction of Ovals", last modified May 11, 2004, , http://users.cs.cf.ac.uk/Paul.Rosin/resources/papers, pp. 1-4.

* cited by examiner

METHOD FOR DESIGNING STRUCTURE BY DRAWING CURVE APPROXIMATELY WITH CIRCULAR SEGMENT, AND STRUCTURE THEREBY

FIELD OF THE INVENTION

The present invention relates to a method for designing a structure or the like by drawing an arbitrary curve approximately using a circular segment.

BACKGROUND

A cylindrical structure having an elliptic horizontal section is extremely graceful in shape and has a great strength. Hence, such a structure offers a novel feeling and a beautiful appearance, and thus, is greatly expected to be popular. In response to such a demand from this viewpoint, the applicant of the present invention previously filed Japanese Patent Application No. 2002-371121 which is titled "METHOD FOR DESIGNING OF APPROXIMATE ELLIPTICAL STRUCTURE AND THE SAME", and Japanese Patent Laid-Open No. 2004-169527.

FIG. 1 is a perspective view of an elliptical structure (A) whose periphery is shaped like an ellipse over its full circumference (shown in FIG. 1 of the above described Application). FIG. 2 is a plan view of the elliptical structure (A), showing its outlined ellipse obtained as a result of mathematical calculation using an elliptic equation by means of a manual operation, a computer or the like. It is provided with a major axis (M) and a minor axis (N) on the coordinates x and y (i.e., its center lines) and is a (whole) outline (B) equivalent to the elliptic outline curve as the entire circumference formed by combining partial outlines ($b_1$), ($b_2$), ($b_3$) and ($b_4$) in a first quadrant (I), a second quadrant (II), a third quadrant (III) and a fourth quadrant (IV), respectively. This elliptic curve is symmetrical with respect to the major axis (M) and the minor axis (N).

However, an elliptic curve which shapes such an ellipse as described above is a quadratic curve which is characterized in that the sum of the distances from a specific point thereon to the two focuses of the ellipse is constant. When an elliptic curve is drawn, two coordinate points which are to be on the elliptic curve may be connected to each other with a single straight line as a convenient method, or with a polygonal line approximate to the elliptic curve. However, in order to connect the two coordinate points with a polygonal line, the distance between the two coordinate points must be finely divided and minute polygonal-line components must be drawn, so that they can be connected to one another. Therefore, in order to obtain an approximate elliptic curve, complex computations and operations are required. Thus, using such an approximate elliptic curve which is thus obtained means that it requires intricate calculations inevitably in designing an elliptical structure. Hence, it is not efficient, economical and feasible in drawing, land-surveying on a building site and fabricating building members.

Therefore, if an approximate elliptic curve is considered as a synthesis of circular segments and is drawn so as to be an ellipse which approximates a real ellipse, then a circle is determined depending upon its center and radius. Hence, such an elliptic curve is easy to design and draw, so that it is pointed out that an elliptical building can be practically and economically constructed. Herein, a method for this is disclosed.

Specifically, in FIG. 3 (showing a main part of FIG. 3 in Japanese Patent Laid-Open No. 2004-169527 described above), in order to obtain an outline ($B_1$) which approximates the above described outline (B), a first fixed point ($C_1$) is established outside of the elliptical structure (A). From here, a straight-line segment ($L_0$) having a predetermined fixed length is drawn through an intersection point (o) of the minor axis (N) and the major axis (M) up to a farthest end point ($P_0$) of the minor axis (N). With use of the first fixed point ($C_1$) as the center and a first straight-line segment ($L_1$) having the same length as that of the straight-line segment ($L_0$) as the radius, an angle $\alpha_1$ is set at the first fixed point ($C_1$), and then, a first circular segment ($d_1$) is set from the point ($P_0$) to a point ($P_1$). Next, a second fixed point ($C_2$) is established on the first straight-line segment ($L_1$). At this second fixed point ($C_2$), an angle $\alpha_2$ is set, and with use of the second fixed point ($C_2$) as the center and a second straight-line segment ($L_2$) as the radius, a second circular segment ($d_2$) following the first circular segment ($d_1$) is set from the point ($P_1$) to a point ($P_2$).

Similarly, circular segments are further set one by one in the above described way, an nth fixed point ($C_n$) established on a ($P_{n-1}$), ($C_{n-1}$) line equivalent to an (n-1)th straight-line segment ($L_{n-1}$) comes onto the major axis (M). With use of an (n-1)th fixed point ($C_{n-1}$) as the center and the (n-1)th straight-line segment ($L_{n-1}$) as the radius, a circle is drawn, and it intersects the major axis (M). This intersection point corresponds to a point ($P_5$) in the example of FIG. 3.

SUMMARY OF THE INVENTION

The present invention provides an efficient and economical means for serving the design, drawing, land survey, manufacture and construction of an elliptical structure when the elliptical structure is built. At the same time, this disclosed method for obtaining an approximate ellipse by connecting circular segments is further developed, so that an arbitrary curve can be designed using circular segments. Thereby, it also provides a useful art for serving the design, drawing, land survey, manufacture, construction and the like of an arbitrary curve.

It is a first purpose of the present invention to approximately obtain an arbitrary curve forming the outline of a structure in general by connecting circular segments, and thereby, to obtain an efficient, economical and practical method for designing and constructing structures with various shapes.

It is a second purpose of the present invention to obtain the ellipse of an elliptical structure approximately by joining circular segments together, and thereby, to obtain an efficient, economical and practical method for designing and constructing the elliptical structure.

It is a third purpose of the present invention to obtain structures with various shapes and an elliptical structure approximately by joining circular segments together, and thereby, to obtain the structures with various shapes and the elliptical structure which are suitable for being efficiently, economically and practically designed and constructed.

These purposes can be achieved by the present invention, which embodiments will be described here with reference to the accompanying drawings. It is needless to say that any possible modifications and variations of the present invention can be covered by the claims which are later given.

The curvature (i.e., value which indicates how much a curved line or a curved surface is curved, or rate of change between two points on a curved line: the radius of this curved line is called a curvature radius) of a circular segment is constant. In FIG. 4, if a line segment X,$P_1$=a line segment $P_1$,$P_2$ on a curve XY, (the rate of change between) the gradient of a tangential line at a point X and the gradient of a tangential line at a point $P_1$ is equal to (the rate of change between) the gradient of the tangential line at the point $P_1$ and the gradient of a tangential line at a point $P_2$. Architecture requires the design of each type of curve or a curved member. However, an ordinary curve differs in the rate of change of a tangential line at each point, and thus, architectural design or its corresponding member is difficult to create. Hence, it is effective to replace such a curve with a circular segment.

In a free curve or an arc (hereinafter, represented as the curve) XY of FIG. 5, a substantially middle point thereof is set as the curvature center of this curve XY. Then, the middle point of a straight-line segment X,Y is Q, and the intersection point of its perpendicular from there and the curve XY is S. In order to express a curve XSY created here with an approximate circular segment, the middle point of a straight-line segment X,S is set as T, and the intersection point of the perpendicular at this middle point T and the line extending from the above described points S, Q is set as $C_0$. Then, the middle point of a straight-line segment S,Y is set as U, and the intersection point of the perpendicular at this middle point U and the line extending from the same points S, Q is set as $C_0'$. In this case, $\Delta TSC_0 \equiv \Delta USC_0'$, which means $SC_0 = SC_0'$, and thus, the point $C_0$ coincides with the point $C_0'$. Hence, $XC_0 = SC_0 = C_0Y$, and thus, $C_0$ is the center of a circular segment XSY. Consequently, a circular segment which approximates to the curve XY can be obtained. Reference character e denotes the distance between the middle point Q and the intersection point S.

As described with reference to FIG. 5, an element which determines the curve XY is, as shown in FIG. 6, the relation (i.e., ratio) between a length 2f of the straight-line segment XY and the distance e between the point S and the middle point Q. Herein, the point S is the intersection point of the curve XY and the perpendicular from the middle point Q of the straight-line segment X,Y connecting the points X and Y. In other words, the element which determines the shape of a curved surface having the free curve XY shown in FIG. 5 is, as shown in FIG. 6, associated with: each length f from the points X and Y up to the middle point Q of the straight-line segment X,Y; and the distance e from this middle point Q up to the intersection point S of the perpendicular from there and the curve XY. This association is crucial. As described above, if the curve XY is replaced with the circular segment (curve) XSY, then using the circular segment XSY, its curvature is leveled off and uniformed so that a curve can be drawn which passes on the points X, S and Y of the circular segment XSY. Specifically, a circular radius r of this circular segment XSY is acquired to obtain a center C, and a circle having the radius r is drawn around this center C. In drawing, as shown in FIG. 5, the center C of this circular segment XSY is acquired as the intersection point of the perpendicular at the middle point T of the straight-line segment XS and the perpendicular at the middle point U of the straight-line segment SY. It lies on the extension of the perpendicular at the middle point Q of the straight-line segment X,Y.

In sum, when the curve XY is approximately drawn with a circular segment, this circular segment's curvature is determined by the relation between the above described straight-line segment X,Y and the distance e between the middle point Q and the intersection point S. This intersection point S is obtained when the perpendicular at the middle point Q of the straight-line segment X,Y reaches the curve XY. Then, if the above described point C which corresponds to the center of the circular segment XSY is determined, then $CX = CY = CS = Radius = r$. Hence, $$SQ = e, \frac{XY}{2} = XQ = QY = f.$$

The radius r of the circular segment XSY is expressed in Mathematical Expression 1.

$$r = \frac{e^2 + f^2}{2e} \qquad \text{[Mathematical Expression 1]}$$

Further details are as follows.

$$QC^2 + f^2 = r^2 \qquad (1) \text{ [based on the Pythagorean theorem]}$$

$$e + QC = r \qquad (2)$$

$$QC = r - e \qquad (3)$$

Herein, if Equation (3) is substituted for its corresponding part of Equation (1), then $$(r-e)^2 + f^2 = r^2$$

$$r^2 - 2er + e^2 + f^2 = r^2$$

$$e^2 + f^2 = 2er.$$

Thereby, the following Mathematical Expression 1 described above is obtained.

$$r = \frac{e^2 + f^2}{2e}$$

If specific numerical values are substituted for their corresponding parts of the above described equations, for example, if XY=20 and SQ=1, then e=1, f=10

$$r = \frac{1^2 + 10^2}{2} = \frac{101}{2} = 50.5.$$

Hence, the radius r can be captured and defined in a numeral.

As shown in the accompanying drawings which are described later, the present invention provides the following items [1], [2], and [3]:

On the basis of the above described principle, the present invention provides [1] a method for designing a structure by drawing an arbitrary curve approximately with a circular segment, comprising the steps of: setting a straight line which connects one end of a desired curve and the other end thereof; setting an intersection point ($S_1$) of the curve and a perpendicular to the straight line at a middle point ($Q_1$) thereof; obtaining a distance ($e_1$) between the intersection point and the middle point, and a length ($f_1$) of a straight-line segment from each of the one end and the other end of the curve up to the middle point ($Q_1$); setting a curvature radius ($r_1$) of a circular segment which approximates the desired curve in association with these distance ($e_1$) and length ($f_1$), and acquiring a radius center point ($C_1$) of the circular segment; and setting a circular segment ($d_1$) from the one end up to the other end of the curve by using this center point ($C_1$) as the center thereof and a structure which is designed and created by the above described designing method, wherein the structure is constructed using a building material.

Furthermore, the present invention provides [2] a method for designing a structure by drawing an arbitrary curve approximately with a circular segment, comprising the steps of: a) determining an arbitrary point ($P_1$) on a desired continuous S-shaped curve XY, setting a straight line which connects a point X and the point ($P_1$), setting an intersection point ($S_1$) of a curve X, $P_1$ and a perpendicular to the straight line at a middle point ($Q_1$) thereof, obtaining a distance ($e_1$) between the intersection point ($S_1$) and the middle point ($Q_1$), and a length ($f_1$) of a straight-line segment from each of the point X and the point ($P_1$) up to the middle point ($Q_1$), setting a curvature radius ($r_1$) of a circular segment X, $S_1$, $P_1$ which approximates the curve X, $P_1$ in association with these distance ($e_1$) and length ($f_1$), setting a radius center of the circular segment X, $S_1$, $P_1$ as a first fixed point ($C_1$), and setting a first circular segment ($d_1$) from the point X up to the point ($P_1$) by using the first fixed point ($C_1$) as the center thereof; b) continuously from the curve X, $P_1$, determining an arbitrary point ($P_2$) on the curve XY which is opposite to the curve X, $P_1$ on the abscissa axis, setting a straight line which connects the point ($P_1$) and the point ($P_2$), setting an intersection point ($S_2$) of a curve $P_1$, $P_2$ and a perpendicular to the straight line at a middle point ($Q_2$) thereof, obtaining a distance ($e_2$) between the intersection point ($S_2$) and the middle point ($Q_2$), and a length ($f_2$) of a straight-line segment from each of the point ($P_1$) and the point ($P_2$) up to the middle point ($Q_2$), setting a curvature radius ($r_2$) of a circular segment $P_1$, $S_2$, $P_2$ which approximates the curve $P_1$, $P_2$ in association with these distance ($e_2$) and length ($f_2$), setting a second fixed point ($C_2$) as the radius center of the circular segment $P_1$, $S_2$, $P_2$ on a line which passes through the point ($P_1$) from the first fixed point ($C_1$), and setting a second circular segment ($d_2$) from the point ($P_1$) up to the point ($P_2$) by using the second fixed point ($C_2$) as the center thereof; and c) setting further continuous circular segments by repeating the step b) successively as required, and a structure which is designed and created by the above described designing method, wherein the structure is constructed using a building material.

Moreover, the present invention provides [3] A method for designing an elliptical structure which is symmetrical with respect to a major axis (M) and a minor axis (N) thereof, has an elliptic outline (B) as the whole circumference thereof and is a cylindrical body, comprising the steps of: in order to set an approximate outline ($B_1'$) of an elliptical structure (A), a) setting a display of a desired elliptic curve F, determining an arbitrary point ($P_1$) on an elliptic segment of the elliptic curve F which starts from an upper-end point ($P_0$) of the minor axis (N), setting a straight line which connects the point ($P_0$) and the point ($P_1$), setting an intersection point ($S_1$) of the elliptic segment and a perpendicular to the straight line at a middle point ($Q_1$) thereof, obtaining a distance ($e_1$) between the intersection point ($S_1$) and the middle point ($Q_1$), and a length ($f_1$) of a straight-line segment from each of the points ($P_0$) and ($P_1$) up to the middle point ($Q_1$), acquiring a curvature radius ($r_1$) of a circular segment which approximates the elliptic segment in association with these distance ($e_1$) and length ($f_1$), setting a first fixed point ($C_1$) on the minor axis (N) using this curvature radius ($r_1$), and setting a first circular segment ($d_1$) on top of the desired elliptic curve F from the point ($P_0$) up to the point ($P_1$) by using the first fixed point ($C_1$) as the center thereof; b) determining an arbitrary point ($P_2$) on the elliptic segment of the elliptic curve F, setting a straight line which connects the point ($P_1$) and the point ($P_2$), acquiring a middle point ($Q_2$) thereof, setting an intersection point ($S_2$) of the elliptic segment and a perpendicular to the straight line at the middle point ($Q_2$), setting a distance ($e_2$) between the intersection point ($S_2$) and the middle point ($Q_2$), and a length ($f_2$) of a straight-line segment from each of the points ($P_0$) and ($P_1$) up to the middle point ($Q_2$), acquiring a curvature radius ($r_2$) of a circular segment which approximates the elliptic segment in association with these distance ($e_2$) and length ($f_2$), setting as a second fixed point ($C_2$) the intersection point of a line of the curvature radius ($r_1$) and this curvature radius ($r_2$), and setting a second circular segment ($d_2$) on top of the desired elliptic curve F from the point ($P_1$) up to the point ($P_2$) by using the second fixed point ($C_2$) as the center thereof; c) Similarly, repeating the step b), acquiring arbitrary points ($P_3$) and ($P_4$) one after another on the elliptic curve F, and setting a fifth circular segment ($d_5$) up to the intersection point of the fifth circular segment ($d_5$) and the major axis (M) by using a fifth fixed point ($C_5$) corresponding to the intersection point of a curvature radius ($r_4$) and the major axis (M) as the center thereof; d) in general, finally, setting an nth circular segment ($d_n$) up to the intersection point of the nth circular segment ($d_n$) and the major axis (M) by using an nth fixed point ($C_n$) corresponding to the intersection point of a curvature radius ($r_{n-1}$) and the major axis (M) as the center thereof to reach a point ($P_n$); and e) by using these steps, setting partial outlines ($b_1'$), ($b_2'$), ($b_3'$) and ($b_4'$) which make up the approximate outline ($B_1'$) in the first to fourth quadrants thereof, and setting the whole outline (B), and an elliptical structure which is designed and created by the above described designing method, wherein the elliptical structure is constructed using a building material and is formed with an outline having an elliptic outline curve as the whole circumference thereof.

A general curve expressed arbitrarily and freely is drawn by joining circular segments together. Specifically, a desired ellipse (i.e., an ellipse acquired and drawn in calculation and an ellipse ideal as its shape) is acquired by making a calculation. This is regarded as a "true ellipse", and this "true ellipse" is expressed in advance. Then, this "true ellipse" is drawn as an approximate ellipse by joining circular segments together. Thereby, such an ellipse can be efficiently drawn because it is close to the "true ellipse", and the number of members for each circular segment can be grasped and counted. If the ellipse is created in such a manner, it is extremely convenient to obtain building members. Hence, using those circular-segment members, a structure can be efficiently built.

DESCRIPTION OF THE PREFERRED EMBODIMENT

Figure 1:
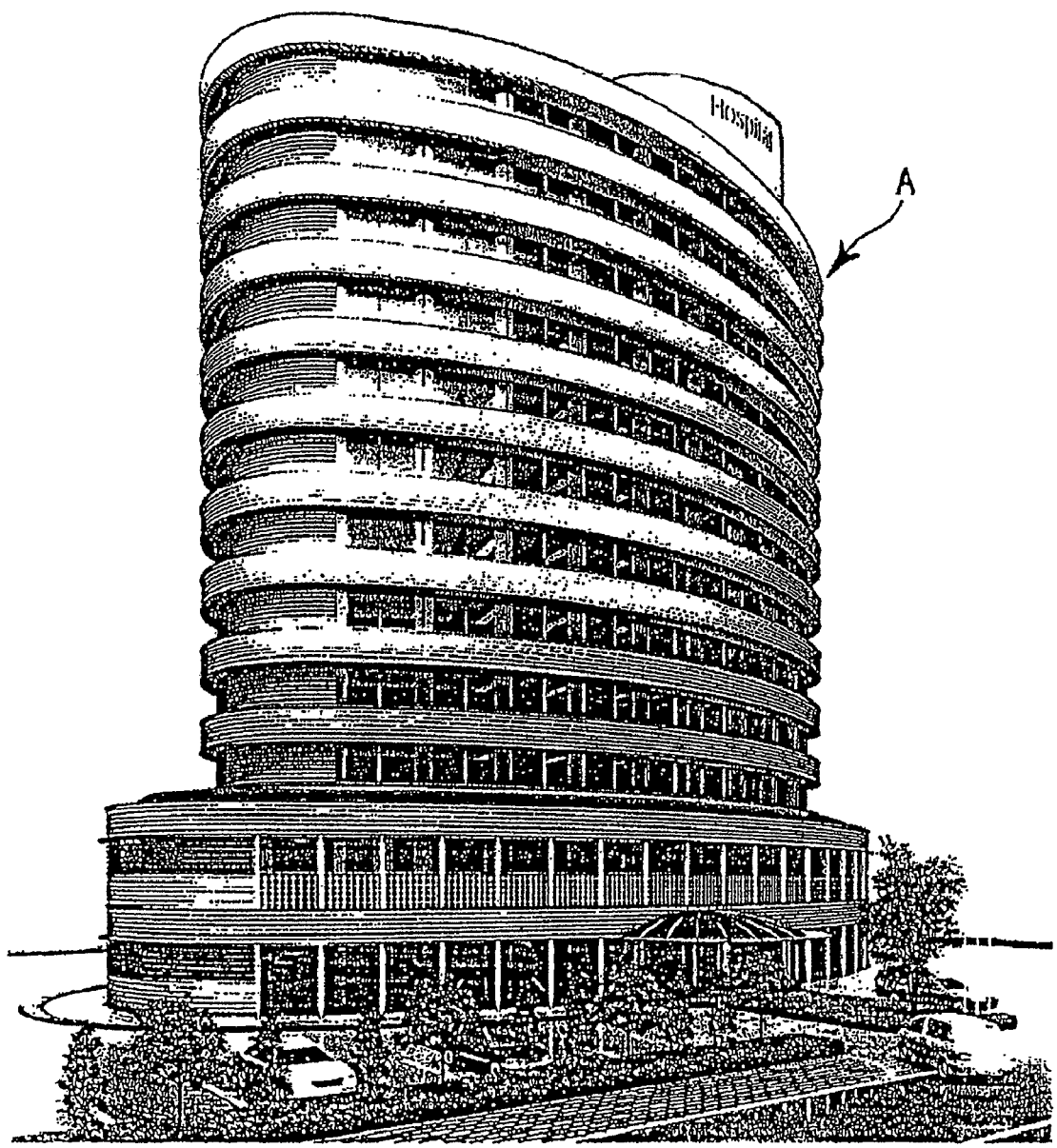
FIG. 1 is a bird's-eye view of an elliptical structure according to a prior art and the present invention.
Figure 2:
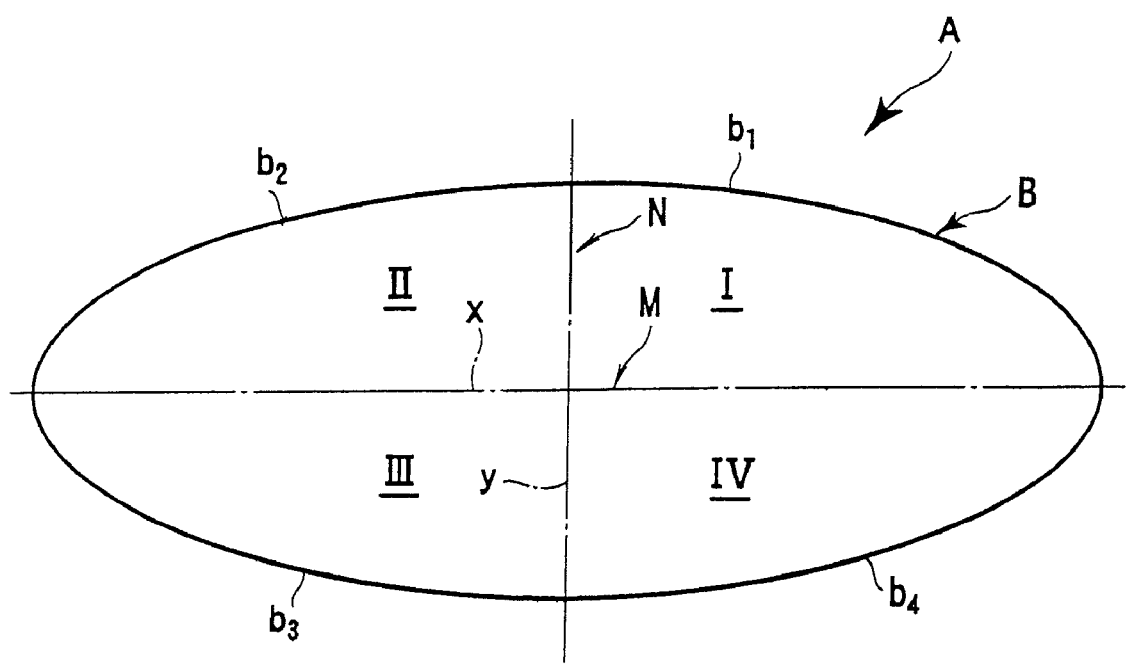
FIG. 2 is a representation, showing an example of how to draw a "true ellipse".
Figure 3:
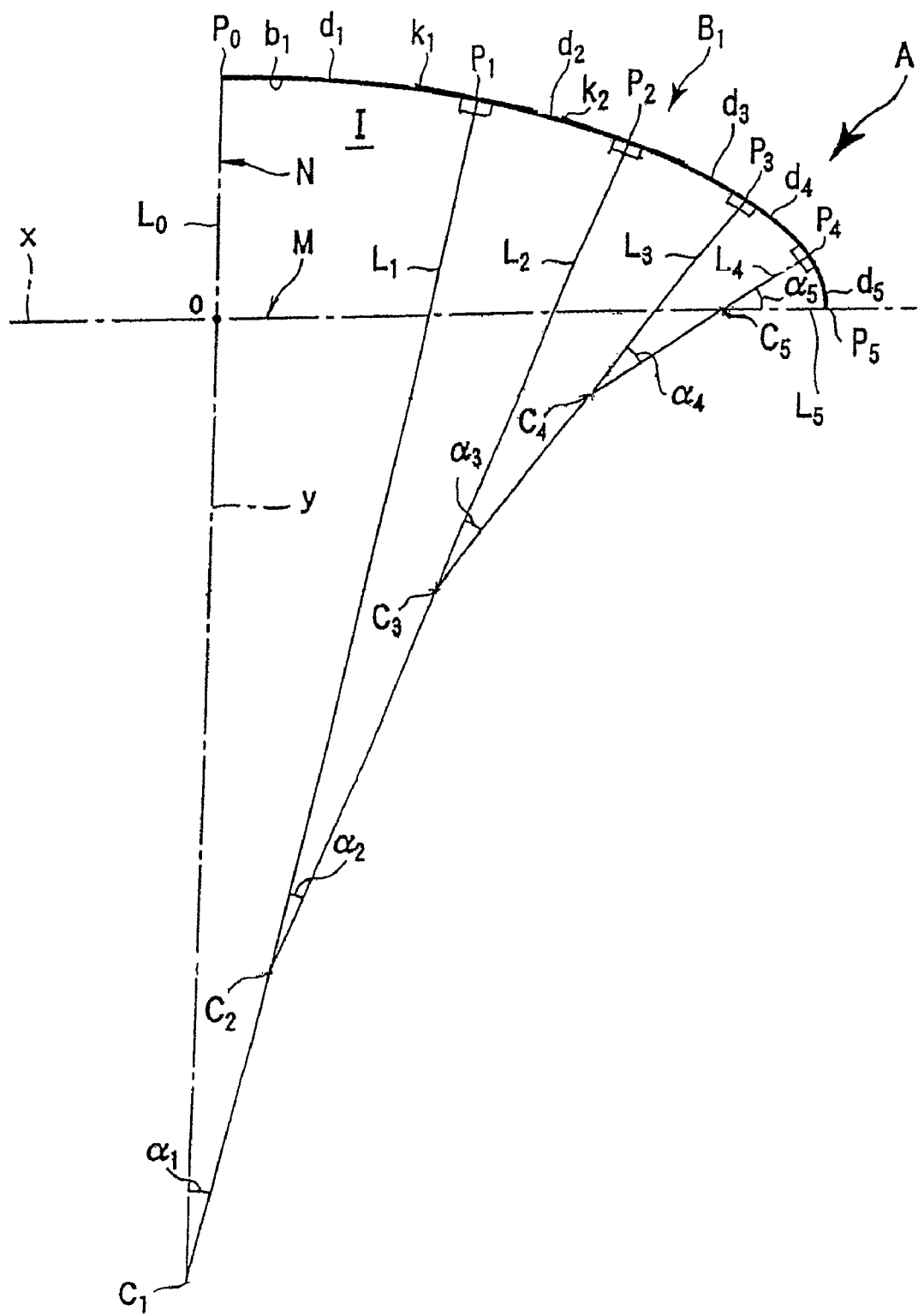
FIG. 3 is a representation, showing how to draw an elliptical structure according to a prior art.
Figure 4:
FIG. 4 is a representation, showing how to form a circular segment.
Figure 5:
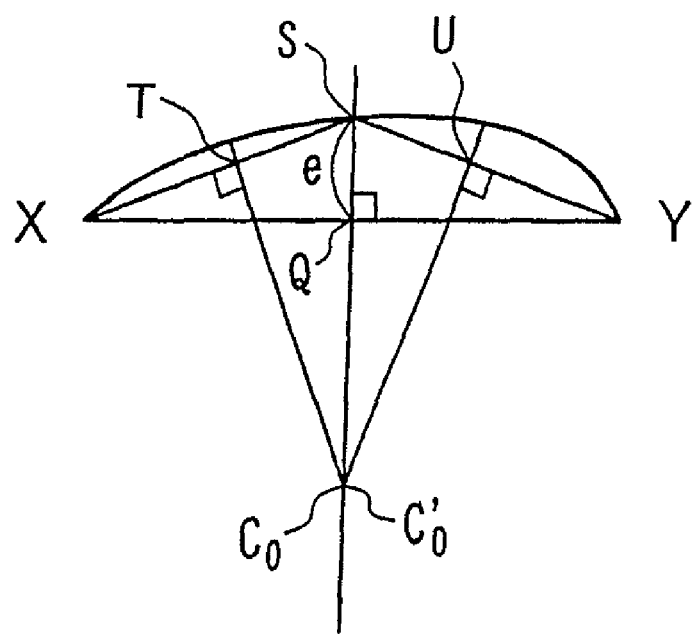
FIG. 5 is a representation, showing how to create a circular segment according to the present invention.
Figure 6:
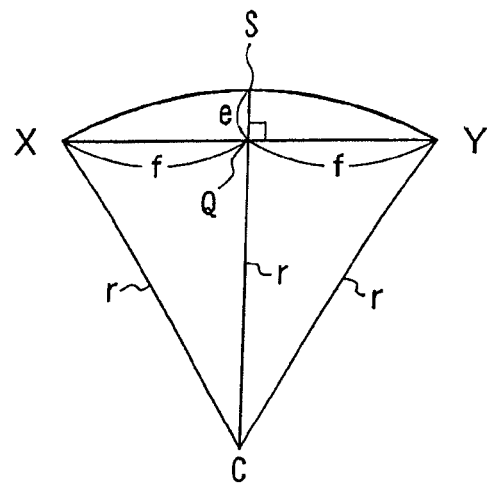
FIG. 6 is a representation, showing in further detail how to create a circular segment in FIG. 5.
Figure 7:
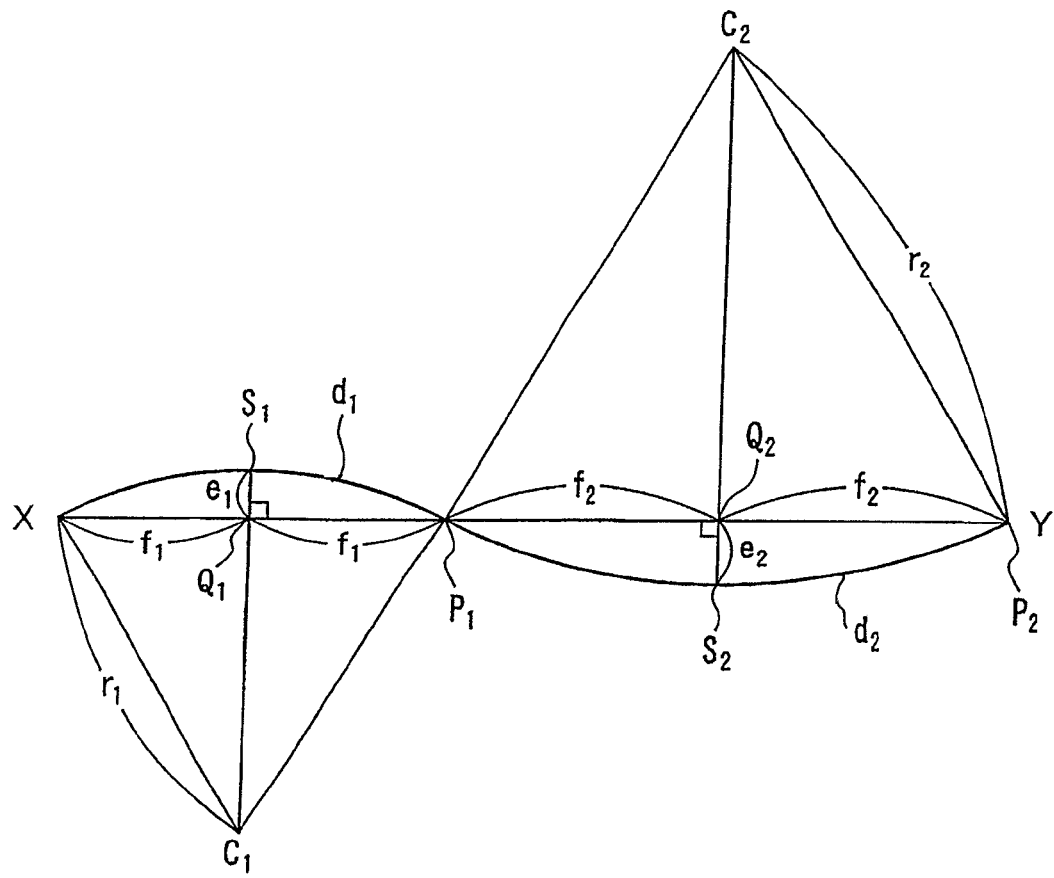
FIG. 7 is a representation, showing how to draw a general curve approximately with a circular segment according to an embodiment of the present invention.

In FIG. 7, as described earlier, in terms of a desired curve XY, a straight-line segment is set which connects a point curve XY, a straight-line segment is set which connects a point X at one end of an initial curve and a point ($P_1$). Then, an intersection point ($S_1$) of the perpendicular at a middle point ($Q_1$) of this straight-line segment and a curve X, $P_1$ is set. Next, a distance ($e_1$) of the perpendicular between these points is obtained, and then, a length ($f_1$) of a straight-line segment from each of the point X and the point ($P_1$) up to the middle point ($Q_1$) is also obtained. In association with these distance ($e_1$) and length ($f_1$), using Mathematical Expression 1 described earlier:

$$r = \frac{e^2 + f^2}{2e}$$

a curvature radius ($r_1$) of a circular segment which approximates the above described desired curve XY becomes as follows.

$$r_1 = \frac{e_1^2 + f_1^2}{2e_1}$$

This curvature radius ($r_1$) is set, and a radius center point ($C_1$) of the circular segment is acquired. By using this as its center, a circular segment ($d_1$) is set from the point X at the one end of the curve XY up to the point ($P_1$). Therefore, such an arbitrary curve can be drawn and designed approximately using a circular segment.

Further, as shown in FIG. 7, as a desired continuous S-shaped curve XY, as described earlier, an arbitrary point ($P_1$) is determined on the curve XY. A straight-line segment which connects the point X and the point ($P_1$) is set, and the intersection point ($S_1$) of the perpendicular at the middle point ($Q_1$) of this straight-line segment and the curve X, $P_1$ is set. Then, the distance ($e_1$) of the perpendicular between these points and the length ($f_1$) of the straight-line segment from each of the point X and the point ($P_1$) up to the middle point ($Q_1$) are obtained. In association with these distance ($e_1$) and length ($f_1$), the curvature radius ($r_1$) of the circular segment which approximates the curve X, $P_1$ is set. Then, a radius center of the circular segment X, $S_1$, $P_1$ is set as a first fixed point ($C_1$), and by using this first fixed point ($C_1$) as its center, the first circular segment ($d_1$) from the point X up to the point ($P_1$) is set. Still further, continuously from the curve X, $P_1$, an arbitrary point ($P_2$) is determined on the curve XY which is opposite to the curve X, $P_1$ on the abscissa axis. Then, a straight line which connects the point ($P_1$) and the point ($P_2$) is set, and an intersection point ($S_2$) of a curve $P_1$, $P_2$ and a perpendicular to the straight line at a middle point ($Q_2$) thereof is set. Next, a distance ($e_2$) of the perpendicular between these points is obtained, and then, a length ($f_2$) of a straight-line segment from each of the point ($P_1$) and the point ($P_2$) up to the middle point ($Q_2$) is also obtained. In association with these distance ($e_2$) and length ($f_2$), using Mathematical Expression 1 described earlier:

$$r = \frac{e^2 + f^2}{2e}$$

a curvature radius ($r_2$) of a circular segment which approximates the above described desired curve $P_1$, $P_2$ becomes as follows.

$$r_2 = \frac{e_2^2 + f_2^2}{2e_2}$$

This curvature radius ($r_2$) is set, and a second fixed point ($C_2$) as the radius center of the circular segment $P_1$, $S_2$, $P_2$ on a line which passes through the point ($P_1$) from the first fixed point ($C_1$) is acquired. By using this second fixed point ($C_2$) as its center, a second circular segment ($d_2$) is set from the point ($P_1$) up to the point ($P_2$). Herein, the second fixed point ($C_2$) lies on a line which is extended from the straight-line segment connecting the first fixed point ($C_1$) and the point ($P_1$). Thus, the circular segment X, $S_1$, $P_1$ and the circular segment $P_1$, $S_2$, $P_2$ have a common tangential line at the point ($P_1$), so that they can be smoothly connected with no offset being produced. Incidentally, in terms of the curve XY, the point Y is its finish end with respect to the point X and is already established with kept unchanged.

In this way, each curve on the curve XY shown in FIG. 7 can be approximately obtained using a circular segment. Therefore, when a large member used for a structure is estimated, or when it is designed and positioned on the soil surface, such work can be extremely simply conducted. This helps cut down the cost, so that such an economical operation is feasible.

These steps are repeated one after another, and various arbitrary curves which follow continuously are allowed to approximate circular segments. This makes it possible to design those curves smoothly and continuously with no offset being produced. This is extremely effective in designing a large building and producing members for this building.

Figure 8:
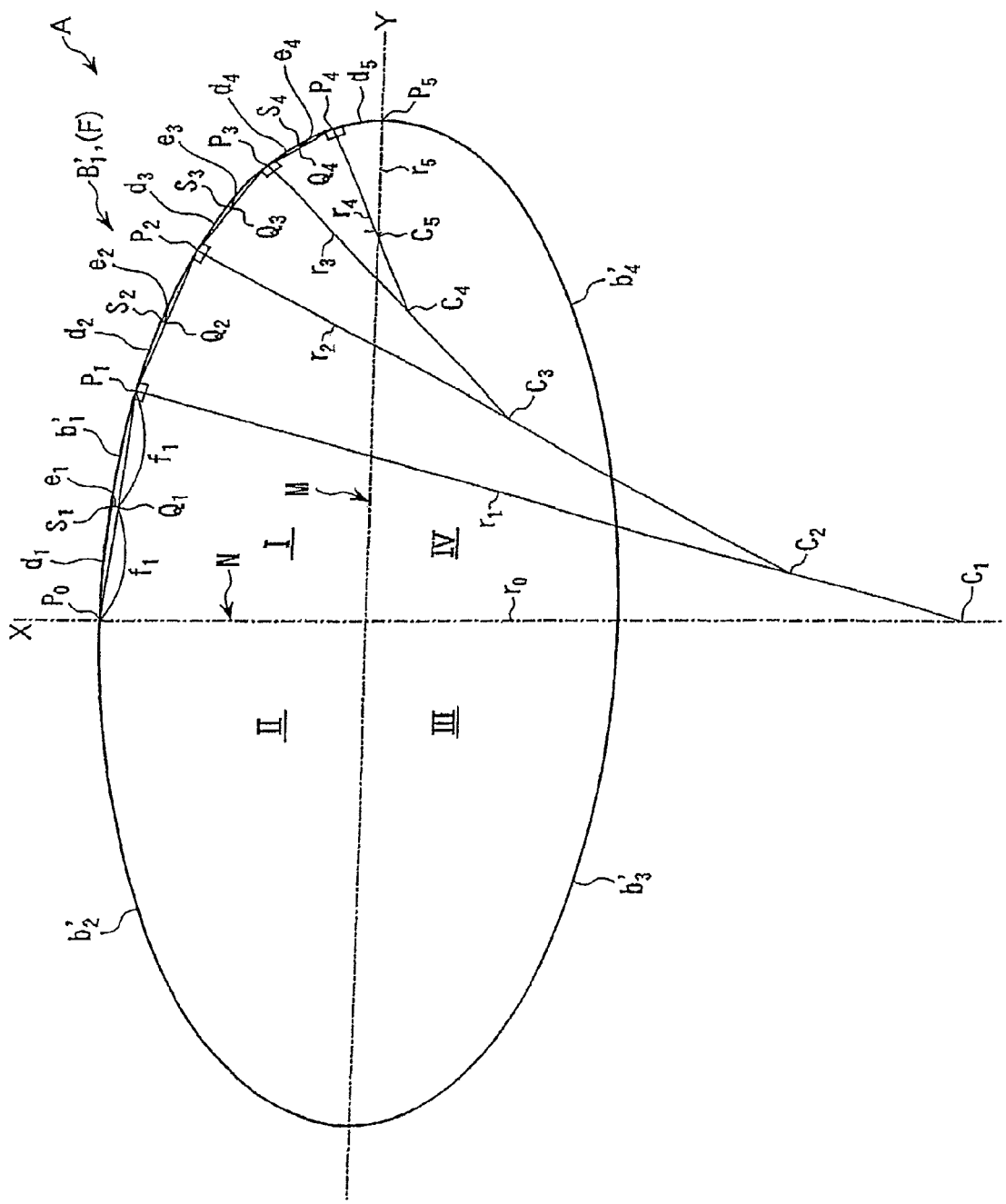
FIG. 8 is a representation, showing how to draw an elliptical structure according to the embodiment of the present invention.

In FIG. 8, in an ellipse with a desired elliptic curve F, between points ($P_0$) and ($P_1$) for forming an initial elliptic segment, a straight line which connects the point ($P_0$) and the point ($P_1$) is set. Then, an intersection point ($S_1$) of the elliptic segment and a perpendicular to the straight line at its middle point ($Q_1$) is set. Sequentially, the length of a straight-line segment $S_1Q_1$ is set as ($e_1$), and the length of each of straight-line segments $P_0Q_1$ and $Q_1P_1$ is set as ($f_1$). Herein, if $P_0Q_1 = Q_1P_1 = f_1$, then a radius ($r_1$) of a first circular segment ($d_1$) between these points ($P_0$) and ($P_1$) becomes, using Mathematical Expression 1, as follows.

$$r_1 = \frac{e_1^2 + f_1^2}{2e_1}$$

This radius ($r_1$) is the curvature radius of the first circular segment ($d_1$). In the ellipse, a radius ($r_0$) which has a length equal to the radius ($r_1$) lies on the minor axis (N) of the ellipse, so that a first fixed point ($C_1$) is set. Herein, the length of a straight-line segment $P_0C_1$ is equal to the length of a straight-line segment $P_1C_1$, and thus, $r_0 = r_1$. Hence, the first circular segment ($d_1$) becomes a circular segment which has the first fixed point ($C_1$) as its center and the radius ($r_1$) as its radius.

In the same way, the relation is considered between the curve between the point ($P_1$) and a point ($P_2$), and the straight line between the points ($P_1$) and ($P_2$). An intersection point ($S_2$) of a curve ($P_1$), ($P_2$) and a perpendicular to the straight line at a middle point ($Q_2$) of the points ($P_1$) and ($P_2$) is set. If $S_2Q_2=e_2$ and $P_1Q_2=Q_2P_2=f_2$, then a radius ($r_2$) of this curve ($P_1$), ($P_2$) becomes, using Mathematical Expression 1, as follows.

$$r_2 = \frac{e_2^2 + f_2^2}{2e_2}$$

This radius ($r_2$) is the curvature radius of a second circular segment ($d_2$).

If the intersection point of this radius ($r_2$) and the above described radius ($r_1$) is set as a second fixed point ($C_2$), then $P_1C_2=P_2C_2$. The radius ($r_2$) differs in length from the radius ($r_1$) and overlaps with it. Hence, the second circular segment ($d_2$) becomes a circular segment which has the second fixed point ($C_2$) as its center and the radius ($r_2$) as its radius.

The same procedure is repeated so that the following third circular segment ($d_3$) and fourth circular segment ($d_4$) formed by imitating each preceding elliptic segment can be drawn.

Then, the intersection point of a radius ($r_4$) and a radius ($r_3$) is set as a fourth fixed point ($C_4$), and the intersection point of the major axis (M) of the ellipse and the straight-line segment connecting the fourth fixed point ($C_4$) and a point ($P_4$) on the elliptic segment is set as a fifth fixed point ($C_5$). By using this fifth fixed point ($C_5$) as its center and a radius ($r_5$) as its radius whose length is equal to that of the corresponding part of the radius ($r_4$), a fifth circular segment ($d_5$) is drawn up to a point ($P_5$) at which it intersects the major axis (M) so that it approximates to the inside of the final end of the major axis (M) set in advance.

In this manner, the major axis (M) and the minor axis (N) are determined as the "true ellipse", and the initial elliptic curve $P_0$, $P_1$ is drawn using an approximate circular segment. In this case, the circular segment's radius center point ($C_1$) is determined on the extended line of its minor axis (N). Hence, $P_0C_1=P_1C_1=r_0=r_1$.

Then, as shown in FIG. 8, the curve of each quadrant of the "true ellipse" is divided into five circular segments so that it can be drawn. Thereby, the approximate ellipse formed by the circular segments comes close to the "true ellipse". In this way, the method of drawing the "true ellipse" approximately using the circular segments starts by allowing an initial line X, $C_1$ shown in this figure to coincide with the ellipse's minor axis (N). On top of the radius ($r_1$) of the first circular segment ($d_1$), the radius ($r_2$) of the following second circular segment ($d_2$) lies. Therefore, the first circular segment ($d_1$) is smoothly linked to the second circular segment ($d_2$) with no offset being produced. After this, finally in a similar manner, the intersection point ($P_5$) of the fifth circular segment ($d_5$) and the major axis (M) comes inside of the "true ellipse".

In these steps, in the first to fourth quadrants, in the same way, partial outlines ($b_1'$), ($b_2'$), ($b_3'$) and ($b_4'$) are set which make up an outline ($B_1'$) which approximates the above described desired elliptic curve F. Consequently, the whole outline (B) can be obtained which is an approximate ellipse as a whole close to the "true ellipse". This makes it possible to design and construct the elliptical structure (A) with a good shape, as well as efficiently obtain a building thereby.

Incidentally, the method of designing the "true ellipse" approximately using such circular segments corresponds to a special example of the case where the above described free curve is designed continuously using the circular segments. This means that in any quadrants, their initial curvature radii coincide with the minor axis (N) of the "true ellipse". The final circular segments formed there are determined so as to approach the inside of the major axis (M) from the end of the above described desired elliptic curve F in the "true ellipse", in other words, the center of the "true ellipse".

The present invention provides an efficient and economical means for serving the design, drawing, land survey, manufacture and construction of an elliptical structure and a structure having an arbitrary curve. By combining circular segments, for example, an approximate elliptic curve can be efficiently formed which is closer to the outline of a structure having an arbitrary curve and the outline of an elliptic body having a "true ellipse". Besides, each circular segment can be smoothly joined, and thus, drawing and calculation for creating each circular segment become easier. These arts are useful directly for producing building members, so that a structure having an arbitrary curve and a structure having an elliptic body can be efficiently constructed.

What is claimed is:

1. A method for producing a drawing of a part of a structure where the part of the structure has an arbitrary curve which is to be approximately represented with a circular segment, comprising the steps of:

establishing a representative curve of the arbitrary curve of the structure which is to be approximated on a viewing medium, the representative curve having first and second ends;

drawing, on the viewable medium using an instrument,
a straight line which connects the first end and the second end of the representative curve;
a perpendicular line perpendicular to the straight line at a middle point of the straight line, and thereby establishing an intersection point of the perpendicular line with the representative curve;

determining, on the viewable medium using an instrument, a distance between the intersection point and the middle point, and a length of a straight-line segment from the first end and from the second end of the representative curve to the middle point;

ascertaining, using the determined distance and the determined length, a curvature radius and a radius center point of a circular segment which approximates the arbitrary curve; and drawing, on the viewable medium using the instrument, a circular segment from the first end to the second end of the representative curve using the ascertained radius and center point.

2. A method for producing a drawing of a part of a structure where the part of the structure has an arbitrary S-shaped curve which is to be approximately represented with at least first and second joined circular segments, comprising the steps of:

a) establishing a representative S-shaped curve of the arbitrary S-shaped curve of the structure which is to be approximated on a viewing medium, the representative S-shaped curve having first and second ends;

b) drawing, on the viewable medium using an instrument, first arbitrary point on the representative S-shaped curve, and thereby establishing a first curved part and a second curved part, c) for the first curved part,
i) drawing, on the viewable medium using the instrument,
a first straight line which connects the first end and the first arbitrary point, and a first perpendicular line perpendicular to the first straight line at a first middle point of the first straight line, and thereby establishing a first intersection point of the first perpendicular line with the first curved part of the representative curve;

ii) determining, on the viewable medium using the instrument, a first distance between the first intersection point and the first middle point, and a first length of a first straight-line segment from the first end and from the first arbitrary point of the first curved part to the first middle point, iii) ascertaining, using the determined first distance and the determined first length, a first curvature radius and a first radius center point of a first circular segment which approximates the first curved part and iv) drawing, on the viewable medium using the instrument, a first circular segment from the first end to the first arbitrary point of the first curved part using the ascertained first curvature radius and the first radius center point;

d) for the second curved part, continuously from the first curved part, i) drawing, on the viewable medium using the instrument, a second straight line which is a straight extension of the first straight line, from the first arbitrary point to thus determine a second arbitrary point on the second curved part of the representative S-shaped curve, a second perpendicular line) perpendicular to the second straight line at a second middle point of the second straight line, and thereby establishing a second intersection point of the second perpendicular line with the second curved part of the representative curve;

ii) determining, on the viewable medium using the instrument, a second distance between the second intersection point and the second middle point, and a second length of a second straight-line segment from the first arbitrary point and from the second endpoint up to the second middle point, iii) ascertaining, using the determined second distance and the determined second length, a second curvature radius of a second circular segment which approximates the second curve, and iv) drawing, on the viewable medium using the instrument, a second circular segment from the first arbitrary point up to the second arbitrary point using the ascertained second curvature radius and the second radius center point; and e) drawing, on the viewable medium using the instrument, further continuous circular segments by repeating the step d) successively as required.

3. A method for producing a drawing of an elliptical structure which is symmetrical with respect to a major elliptical axis and a minor elliptical axis thereof, where the elliptical structure has an elliptic outline which is to be approximated as the whole circumference thereof, and where the elliptical structure is a cylindrical body, said method comprising the steps of:

a) establishing a first representative quadrant of the elliptical structure defined by the major and minor axes which is to be approximated on a viewing medium;

b) for a first elliptic segment of the first representative quadrant:

i) drawing, on the viewable medium using an instrument, a first arbitrary point on the first representative quadrant which starts from a first end point of the minor axis, a first straight line which connects the first end point and the first arbitrary point, a first perpendicular line to the first straight line at a first middle point of the first straight line, and thereby establishing a first intersection point of the first perpendicular line with the first representative quadrant which defines the first elliptic segment, ii) determining, on the viewable medium using the instrument, a first distance between the first intersection point and the first middle point, and a first length of a first straight-line segment from the first end points and from the first arbitrary point to the first middle point, iii) ascertaining, using the first determined distance and the first determined length, a first curvature radius of a first circular segment which approximates the first elliptic segment, and iv) drawing, on the viewable medium using an instrument, a first fixed point on the minor axis using the first curvature radius, and a first circular segment from the first end point to the first arbitrary point by using the first fixed point as the center thereof;

c) for a second elliptic segment of the first representative quadrant which is to be continuous from the first elliptic segment:

i) drawing, on the viewable medium using an instrument, a second arbitrary point which starts from the first arbitrary point and which thereby defines the second elliptic segment, a second straight line which connects the first arbitrary point and the second arbitrary point, a second perpendicular line to the second straight line at a second middle point of the second straight line, and thereby establishing second intersection point of the second perpendicular line with the first representative quadrant which defines the second elliptic segment, ii) determining, on the viewable medium using the instrument, a second distance between the second intersection point and the second middle point, and a second length of a second straight-line segment from the second arbitrary points and from the first arbitrary point to the second middle point, iii) ascertaining, using the second determined distance and the second determined length, a second curvature radius of a second circular segment which approximates the second elliptic segment, and iv) drawing, on the viewable medium using an instrument, a second fixed point at an intersection point of a first radial line from the first fixed point to the first arbitrary point of the curvature radius and this curvature radius from the first arbitrary point, and setting a second circular segment from the first arbitrary point to the second arbitrary point by using the second fixed point as the center thereof;

d) similarly, repeating the step c) successively, by i) drawing successive arbitrary points, successive straight lines and successive perpendicular lines, ii) determining successive distances and successive lengths, iii) ascertaining successive curvature radii, and iv) drawing successive fixed points and successive circular segments one after of the first representative quadrant, up to an nth circular segment is drawn from an n-1 arbitrary point to a first end point of the major axis, whereby the first representative quadrant has been approximated; and e) repeating steps b), c) and d), as necessary, to approximate second to fourth quadrants of, the whole elliptic outline of the elliptic structure.

* * * * *